March 12, 1963  J. C. THOMAS III  3,081,060
TRACER VALVE MECHANISM
Filed Feb. 7, 1958
2 Sheets-Sheet 2

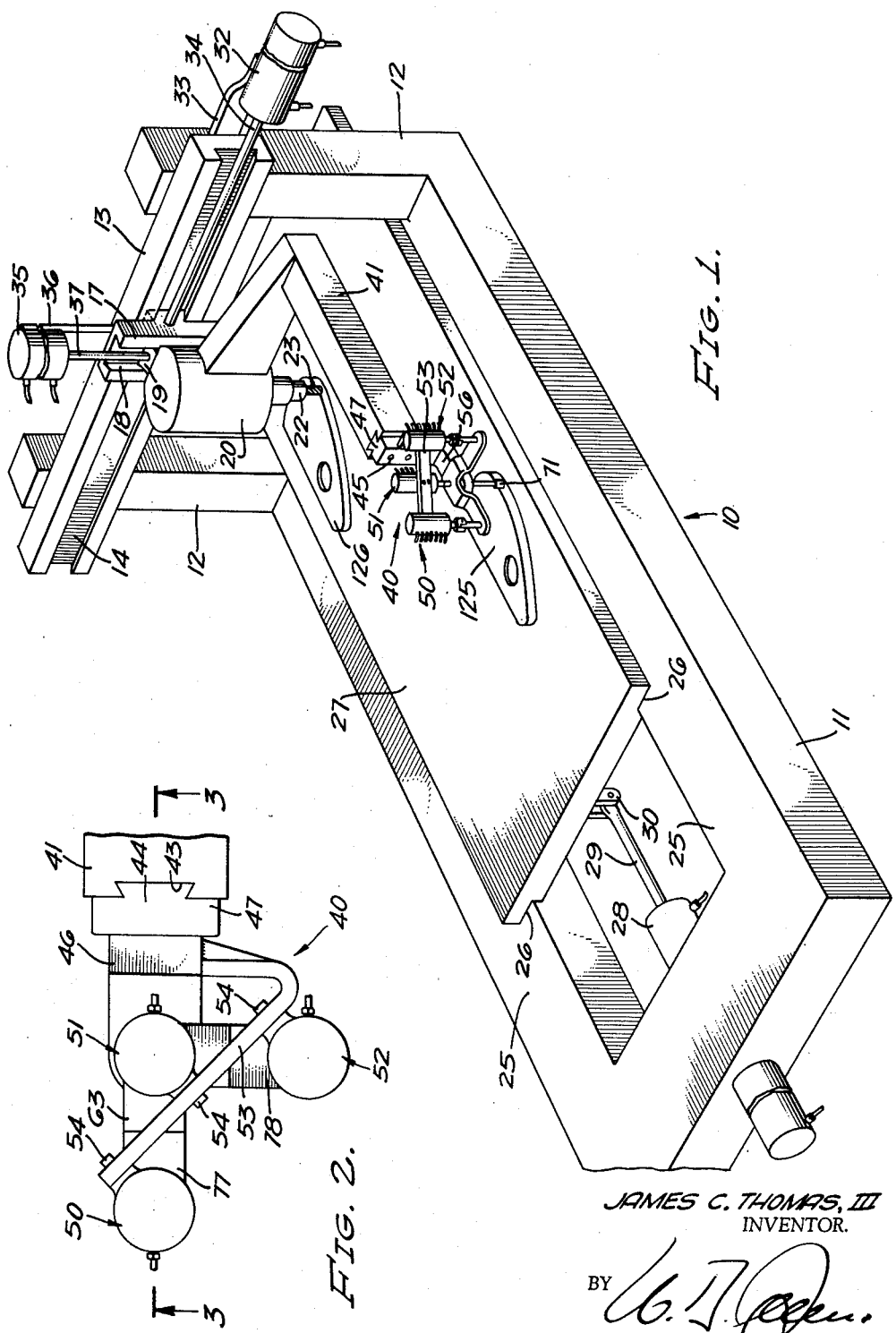

JAMES C. THOMAS, III
INVENTOR.

BY
ATTORNEY

United States Patent Office 3,081,060
Patented Mar. 12, 1963

3,081,060
TRACER VALVE MECHANISM
James C. Thomas III, Pasadena, Calif., assignor, by mesne assignments, to Young Spring & Wire Corporation, Detroit, Mich., a corporation of Michigan
Filed Feb. 7, 1958, Ser. No. 713,856
4 Claims. (Cl. 251—3)

This invention relates to hydraulic control circuits and more particularly to an improved three-dimensional tracer control valve for use on machine tools and by means of which work pieces may be precisely machined.

The fluid control problems with which the invention is concerned are many fold and are increasing daily with the increasing uses being found for fluid power. These problems are to be found, for example, in machine tools and particularly with respect to those suitable for control by tracer and profile mechanisms used in the machining of parts from an accurately finished pattern. Various tracer control mechanisms have been proposed heretofore in an attempt to meet the exacting requirements of such service. Fairly satisfactory results are obtainable with two-dimensional tracer controls as presently designed, but available three-dimensional tracers have been unsatisfactory and unreliable in service. Furthermore they are characterized by their great complexity and high cost due to the high cost incident to the high tolerance machining required for the many components. By the present invention there is provided a greatly simplified structure featuring ruggedness, a limited number of precision parts and making use in the main of commercially available components arranged for actuation by a simple, unitary control linkage having direct connection with the stylus. This linkage includes a rigid bell crank adapted to be universally supported at its axis. The stylus is slidably supported through the universal mounting for the bell crank and is effective by such movement to actuate one control valve. To other valves connected to the respective arms of the bell crank through ball and socket connections are responsive to angular movements of the stylus to control fluid flow in a manner reflecting the direction and magnitude of stylus movement.

Accordingly, it is a primary object of the present invention to provide an improved three-dimensional tracer control for use on three-dimensional machine tools.

Another object of the invention is the provision of a unitary three-dimensional master control valve utilizing independent hydraulic control valves having axes arranged parallel to one another and adapted to follow faithfully and with high precision the movements of a universally supported bell crank and stylus-supporting device.

Another object is the provision of a three-dimensional mechanism wherein all components are readily accessible for the making of adjustments and servicing and wherein the principal control valves are separately housed and supported to the end that each may be readily replaced as a sub-unit when operating difficulties are encountered and without disturbing the adjustments or connections to other sub-units.

These and other more specific objects will appear upon reading the following specification and claims and upon considering in connection therewith the attached drawings to which they relate.

Referring now to the drawings in which a preferred embodiment is illustrated:

FIGURE 1 is an isometric view of a typical machine tool incorporating the tracer control mechanism of the present invention;

FIGURE 2 is a top plan view on an enlarged scale of the tracer control assembly per se;

Figure 3:
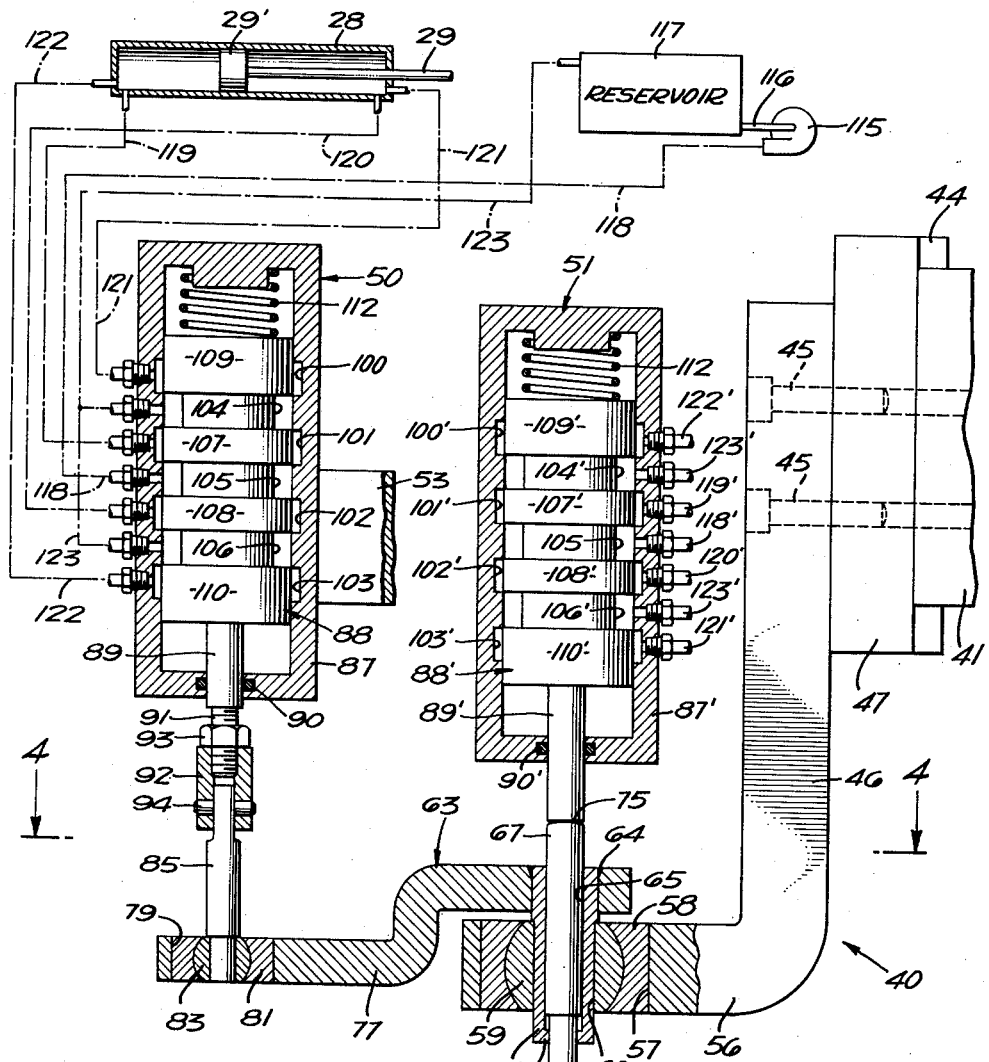
FIGURE 3 is a longitudinal sectional view taken along line 3—3 on FIGURE 2 and indicating by dot-and-dash lines the manner of connecting the hydraulic fluid lines to one of the reversible hydraulic motors of the machine tool.

Referring first to FIGURE 1, there is shown a typical machine tool designated generally 10 having a main frame 11 provided at one end with the usual upright columns 12, 12. Fixed crosswise of the upper ends of columns 12 is cross-beam 13 provided with a groove 14 having accurately ground converging side walls slidably supporting therein a complementarily shaped slide member 16. Slide member 16 is integral with an upright member 17 similarly channeled at 18 to provide an accurately ground groove having converging side walls serving as a raceway for a slide member 19. The latter is integral with and extends along the side of housing 20 for the cutting tool driving motor. This motor has an outlet shaft connected to drive a tool chucking device 22 in which cutting tool 23 is detachably mounted.

The horizontal portion of machine tool frame 11 is provided along its opposite sides with accurately machined guide ways on which the similarly finished surfaces 26 of a bed plate 27 are slidable to and fro beneath cutting tool 23. Bed plate 27 may be moved to any operating position lengthwise of the main frame by means of a reversible hydraulic motor or ram conveniently provided by an elongated cylinder 28 reciprocally supporting therewithin a piston 29' fixed to a piston rod 29 suitably connected to bed 27, as by the pin and clevis 30.

Slide member 17 is adapted to be moved to and fro transversely of bed plate 27 and lengthwise of groove 14 by means of a similar reversible hydraulic motor 32 rigidly secured to cross-beam 13, as by bracket 33. This motor is provided with a cylinder enclosing a piston having a piston rod 34 secured to the upright member 17 in the manner illustrated in FIGURE 1. The tool driving motor mounted within housing 20 is elevated or lowered with respect to the bed plate 27 by means of a third reversible hydraulic motor 35 carried by a bracket 36 anchored to upright 17 and having a piston connected to slide 19 of motor housing 20 through a piston rod 37. It will therefore be understood that cutting tool 23 and its driving motor are arranged to be hydraulically shifted toward or away from the bed plate or crosswise thereof. Likewise separate hydraulic means is provided for shifting the bed plate lengthwise of main frame 11.

The three-dimensional master control assembly designated generally 40 is mounted on the outer free end of an L-shaped heavy duty bracket 41 one end of which is rigidly anchored to the side of motor housing 20 and is movable therewith. To facilitate detachment of the controls assembly as a unit from the outer free end of arm 41, the latter is provided with a vertical grooveway 43 slidably supporting therein the complementarily shaped slide member 44 integral with slide plate 47. This plate as well as bracket 46 is held securely in place on arm 41 as by a pair of cap screws 45.

Referring now to FIGURES 2 and 3 it will be seen that master control assembly 40 includes three identical four-way hydraulic valves designated generally 50, 51 and 52. These valves are rigidly secured by cap screws 54 to a heavy duty bracket 53 having one end welded to the L-shaped bracket 46. It is emphasized that the longitudinal axes of valves 50, 51 and 52 are vertically supported and accurately parallel to one another. It is further pointed out that these valves are precisely located relative to one another in the manner depicted in FIGURE 2 with their axial centers spaced equidistantly along lines at right angles to one another and lying in a plane normal to their longitudinal axes.

Referring now to FIGURE 3, it will be understood that horizontal leg 56 of bracket 46 is provided with a bore 57 in which is seated a spherical bearing ring 58 accurately seating therewithin a ball 59. It will be understood that bearing ring 58 may be formed in halves for convenience of assembly about ball 59 and suitable means, not shown, may be employed for holding the universal bearing assembly in place in bore 57. Fitting snugly within a diametric bore 60 through ball 59 is a shank 61 projecting downwardly from a bell crank 63, the shank 61 being fixed thereto, as by welding 64. Shank 61 is provided with an accurately finished axial bore 65 having a slight shoulder 66 at its lower end serving as a stop for the shouldered lower end of stylus spindle 67 having a close sliding fit within bore 65. It will be understood that under actual operating conditions the stylus shoulder is always positioned above shoulder 66. The lower end 68 of the stylus projects downwardly from shank 61 and is provided with an axial bore 69 seating shank 70 of a detachable stylus follower 71, the latter being held in place in stem 68, as by a set screw 72. The upper end 75 of stylus spindle 67 has a spherical surface the radius of which extends to the center of ball 59 and the purpose of which will become apparent hereinafter.

Figure 4:
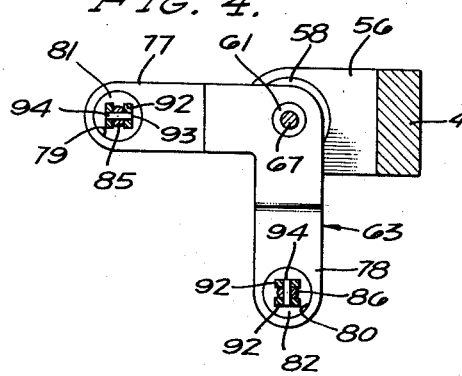
FIGURE 4 is a transverse sectional view taken on line 4—4 of FIGURE 3.

Bell crank 63 forms an important feature of the invention and includes a pair of identical arms 77 and 78 having axes extending at right angles to one another from stylus spindle 67, as is made clear by FIGURE 4. It will also be seen from FIGURE 3 that the outer ends of arms 77 and 78 are offset downwardly so that their horizontal center lines lie in a plane passing through the center of ball 59, this being an important feature of the construction as will be explained. The outer end of each arm is provided with similar bores 79 and 80 having their centers located at equal distances from the axis of bore 65 in shank 61. Firmly seated in each bore 79, 80 is a spherical bearing 81, 82 for a ball 83, 84 fixed to one end of short vertical links 85, 86, it being understood that the longitudinal axes of links 85, 86 are in alignment with the longitudinal axes of the associated four-way valves 50 and 52.

The manner in which the outer ends of bell crank 63 are connected to the operating spools within the identical hydraulic valves 50 and 52 are the same for which reason only the connecting linkage for valve 50 need be described. Each of the four-way valves 50 and 52 includes a generally cylindrical casing 87 slidably supporting therewithin a conventional four-way valve spool 88 having a stem 89 projecting downwardly through a sealing gasket 90. The threaded lower end 91 of stem 89 is threadedly seated axially of knuckle 92 and is locked in any adjusted position therein, as by lock nut 93. Pivotally secured to knuckle 92 by a knuckle pin 94 is the flattened upper end of link 85. It is pointed out that the axes of pins 94 connecting links 85, 86 to their respective knuckles are arranged at right angles to one another and cooperate in preventing rotation of bell crank 77 about the axis of the stylus spindle. Although not so shown, it will be understood that spherical bearing 81 may be constructed similarly to spherical bearing 58 and so adjusted relative to balls 83 and 95 respectively, as to permit free movement without lost motion whereby any movement of the bell crank is transmitted faithfully to the valve spool 88.

The interior sidewall of the three valve housings are provided with identical grooves cooperating with identical grooves in the valve spools. Accordingly, a description of one will be understood to apply to all. The similar annular grooves 100, 102, and 103 of valve 50 have widths exactly equal to the widths of annular grooves 104, 105 and 106 and to the widths of the intervening lands 107 and 108. Lands 109 and 110 at the opposite ends of spool 88 are considerably wider and extend to either side of grooves 100 and 103 respectively, as is clearly shown in FIGURE 3. In the normal position of the parts, the valve spool occupies the position illustrated in FIGURE 3 wherein bell crank 63 lies in a horizontal plane and grooves 100, 101, 102 and 103 are fully closed by the valve lands lying thereopposite. In consequence it will be understood that vertical movement of valve spool 88 in either direction from the described normal position is effective to pass liquid between the annular grooves in the valve housing and those in the spool, the direction of fluid flow depending on the direction of valve movement.

It will be understood that valve 51 is identical with valves 50 and 52 in construction and that its function is to control vertical movement of the cutter tool 23 toward and away from bed plate 27. Accordingly, the corresponding features of valve 51 have been designated by the same reference characters as used in describing valves 50 and 52 but are distinguished by the addition of a prime. The one distinction is that valve stem 89' of valve spool 88' has a flat, lower end resting directly against the spherical upper end 75 of stylus spindle 67.

Valve 50 is employed to control movement of bed plate 27 to and fro lengthwise of machine tool frame 11 and is, accordingly, connected by suitable hydraulic connections to control the operation of hydraulic cylinder 28. The manner in which the three four-way valves operate to control the movements of the three reversible hydraulic motors 28, 32 and 35 are well known to those skilled in this art and will be briefly described by the aid of typical conduit connections such as those for interconnecting valve 50 and motor 28 and represented by dot-and-dash lines in FIGURE 3. Such a hydraulic system includes a motor-driven pump 115 having its inlet connected by conduit 116 to a hydraulic fluid reservoir 117. The high pressure side of pump 115 discharges through a high pressure conduit 118 into the high pressure fluid distributing groove 105 of valve spool 88. It will be recognized that line 118 preferably includes a pressure relief valve of any suitable design having a bleed-off leading to the reservoir and that leakage return lines may and preferably are connected between the opposite ends of valve 50 and the top of reservoir 117.

The opposite ends of motor cylinder 28 are connected through conduits 119 and 120 with annular grooves 101 and 102 respectively, and are normally cut off from communication with high pressure groove 105 by lands 107 and 108, respectively. However, the slightest upward movement of spool 88 from this normal or neutral position allows high pressure fluid to pass from groove 105 into groove 101 for flow to the left hand end of cylinder 28, such flow there being effective to move piston 29', rod 29 and bed plate 27 to the right as viewed in FIGURES 1 and 3. Contrariwise, movement of spool 88 slightly downward from neutral acts to supply pressure fluid from groove 105 into groove 102 for flow through conduit 120 into the right hand end of cylinder 28 where it is effective to move bed plate 27 to the left.

In order that the described movement of the bed plate can take place it is necessary that fluid trapped in the opposite ends of cylinder 28 be exhausted in an amount exactly equal to the amount of fluid being admitted to the other end of the cylinder. For this purpose the opposite ends of the cylinder are connected through conduits 121 and 122 respectively, with annular grooves 100 and 103 normally sealed closed by lands 109 and 110 respectively. Upward movement of the spool to admit fluid into the left hand end of cylinder 28 allows an equal amount of fluid to exhaust from the right hand end of the cylinder and thence into groove 104 for exhaust back to the top of reservoir 117 through conduit 123. Likewise, upward movement of spool 88 to admit high pressure fluid into the right hand end of cylinder 28 allows an equivalent amount of liquid to exhaust from the left hand end of the cylinder through conduit 121 into groove 103 and thence into groove 106 for exhaust to the reservoir through conduit 123.

From the foregoing it will be evident that when stylus 71 is in its normal vertical or neutral position against the side of pattern 125, spools 88 and 88' for control valves 50 and 52 respectively, are likewise in a neutral position. Under these conditions, cutter tool 23 occupies an identical position relative to work-piece 126 as the stylus follower 71 occupies with respect to pattern 125, it being pointed out the accurately finished pattern is rigidly clamped to bed plate 27 beside the stylus and that the unfinished workpiece 126 is clamped to the bed plate beside the cutting tool. Valve 52 functions identically in the manner described for valve 50 to control the crosswise drive of motor 32 which is effective to move upright member 17 and attached motor housing 20 to and fro crosswise of bed plate 27.

Likewise control valve 51 is effective to control the hydraulic motor 35 to shift slide 19 and attached motor housing 20 toward and away from bed plate 27 to the end that cutter tool 23 will be elevated or lowered at the same rate and by the same amount as stylus follower 71 and spindle 67 move upwardly or downwardly through the universal bearing 58, 59. It is pointed out that vertical movement of the stylus spindle is effective to control valve spool 88' without involving any movement of bell crank 63 or of control valves 50 and 52 owing to the fact that the stylus spindle is free to reciprocate in bore 65.

From the foregoing it will be recognized that the location of the operating connection 81, 83 between the ends of the bell crank arms in a plane in common with the center of the universal joint 58, 59 when the parts are in their neutral positions is significant and provides instantaneous response to movement of the stylus with a minimum resultant possibility for error. Furthermore, it is emphasized that movement of the stylus to or fro in a path parallel to the longitudinal axis of bed plate 27 occurs without producing any movement of the spool for valve 52. As a result, the bed plate is moved independently of and without any movement of the cutter in a vertical direction or in a direction crosswise of the bed plate. In like manner the movement of the stylus in a direction at right angles to the longitudinal axis of the bed plate produces a corresponding movement of motor 32 without producing any movement whatever of the pistons for motors 28 or 35. Accordingly, it is seen that the described master control functions in cooperation with the three reversible hydraulic motors to provide a high-fidelity three-dimensional profiling control for the continuously driven cutter tool 23.

In use, a prefinished pattern 125 is secured to bed plate 27 and an unfinished similar workpiece 126 is similarly secured to the bed plate adjacent cutter tool 23, care being exercised that the workpiece bears the same relation to cutter 23 as stylus follower 71 bears to pattern 125. It is also important that stylus follower 71 has the same diameter as cutter 23 and that the lower edges of each lie in a common horizontal plane. The only operations required of the operator are to make certain that the power supply for hydraulic pump 115 is on and that the main control switch for the cutter driving motor is closed. He then applies sufficient pressure to the end of stylus 68 to maintain follower 71 in contact with pattern 125, shifting the stylus as necessary to advance it along the edge of the pattern. The very slight movements of the stylus away from its normal neutral or vertical position is then effective in the manner described to shift the stylus vertically relative to the universal joint for the bell crank 63 or, in addition or alternately, to rock the bell crank from its normal horizontal plane. Such rocking of the bell crank from its neutral plane operates to open and close valves 50 and 52 proportionately to the tilting of the bell crank causing the cutter tool faithfully to follow the stylus in a manner which will be readily understood by those skilled in this art.

While the particular high-precision three-dimensional tracer control device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A master control valve assembly for use in a three-dimensional follower system, said valve assembly comprising a stationary support having a socket, rigid arm means universally supported in said socket, a stylus extending through the center of said socket normal to the plane of said arm means, said stylue being freely slidable axially thereof relative to said socket, three fixedly-supported hydraulic flow control valves enclosing movable valve elements, one of said valve elements being aligned with and in contact with one end of the stylus, the movable valve elements of the other two valves being operatively connected with respective ones of said arm means at points spaced 90 degrees apart in a plane at right angles to the axis of said stylus and intersecting said socket, said valve elements being responsive to the slightest movement of the free end of the stylus in any direction to move one or more of said movable valve elements to modify fluid flow therethrough, said last mentioned pair of valve elements having a universal positive connection with the outer end of an associated one of said arms and being spring biased toward said arm means and toward said stylus and cooperating with one another in constantly tending to bias said stylus toward a neutral position.

2. A master control valve assembly as defined in claim 1 characterized in that said valve elements are movable along axes parallel to one another and to the axis of said stylus.

3. A master control valve assembly as defined in claim 1 characterized in that the center of said socket and the operative connections between said arms and the valve elements actuated thereby lie in substantially a common plane in all operating positions of said control valve assembly.

4. A master control valve assembly as defined in claim 3 characterized in that the longitudinal axes of said valve elements and of said stylus are parallel to one another.

References Cited in the file of this patent

UNITED STATES PATENTS

| | | |
|---|---|---|
| 2,221,459 | Sassen | Nov. 12, 1940 |
| 2,332,533 | Roehm | Oct. 26, 1943 |
| 2,424,031 | Heer | July 15, 1947 |
| 2,787,437 | Turchan | Apr. 2, 1957 |